United States Patent
Yu

(10) Patent No.: US 11,711,335 B2
(45) Date of Patent: Jul. 25, 2023

(54) COMMUNICATION METHOD APPLIED TO EDGE COMPUTING SCENARIO, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Yi Fan Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/675,423

(22) Filed: Feb. 18, 2022

(65) Prior Publication Data
US 2022/0174038 A1 Jun. 2, 2022

Related U.S. Application Data

(63) Continuation of application No. PCT/CN2020/125879, filed on Nov. 2, 2020.

(30) Foreign Application Priority Data

Feb. 17, 2020 (CN) .......................... 202010095909.5

(51) Int. Cl.
*H04L 61/2592* (2022.01)
*H04L 12/46* (2006.01)
(Continued)

(52) U.S. Cl.
CPC ...... *H04L 61/2592* (2013.01); *H04L 12/4633* (2013.01); *H04L 45/74* (2013.01); *H04L 61/5007* (2022.05); *H04L 67/141* (2013.01)

(58) Field of Classification Search
CPC . H04L 61/2592; H04L 61/5007; H04L 45/74; H04L 67/141; H04L 12/4633
(Continued)

(56) References Cited

U.S. PATENT DOCUMENTS

| | | | | |
|---|---|---|---|---|
| 2009/0059848 A1* | 3/2009 | Khetawat | .............. | H04W 12/06 370/328 |
| 2014/0050208 A1* | 2/2014 | Annaluru | ................ | H04W 8/26 370/338 |

(Continued)

FOREIGN PATENT DOCUMENTS

| | | |
|---|---|---|
| CN | 108243409 A | 7/2018 |
| CN | 109951880 A | 6/2019 |

(Continued)

OTHER PUBLICATIONS

Chinese Office Action for 202010095909.5 dated Mar. 2, 2021.
(Continued)

*Primary Examiner* — Ruolei Zong
(74) *Attorney, Agent, or Firm* — Sughrue Mion, PLLC

(57) ABSTRACT

A communication method is provided. The method includes transmitting a network address assignment request to the network address translation entity after establishing a general packet radio service (GPRS) tunneling protocol (GTP) tunnel between the first user-plane function entity and the second user-plane function entity, such that the network address translation entity assigns a network address to the GTP tunnel, notifying the network address assigned by the network address translation entity to the GTP tunnel to the central data network, controlling a data packet to be transmitted by the edge service node to the central data network to be transmitted through the GTP tunnel, the network address translation entity replacing a source address of the data packet with the network address, and transmitting the data packet to the central data network after the data packet arrives at the network address translation entity.

20 Claims, 5 Drawing Sheets

(51) Int. Cl.
*H04L 45/74* (2022.01)
*H04L 61/5007* (2022.01)
*H04L 67/141* (2022.01)

(58) Field of Classification Search
USPC .......................................................... 709/245
See application file for complete search history.

(56) References Cited

U.S. PATENT DOCUMENTS

| | | | |
|---|---|---|---|
| 2014/0064246 A1* | 3/2014 | Baillargeon | H04L 61/2592 370/329 |
| 2017/0250948 A1* | 8/2017 | Rune | H04L 61/5046 |
| 2017/0289856 A1* | 10/2017 | Rune | H04W 36/0016 |
| 2018/0091323 A1* | 3/2018 | Haag | H04L 45/24 |
| 2019/0116118 A1* | 4/2019 | Kapela | H04L 69/22 |

FOREIGN PATENT DOCUMENTS

| | | |
|---|---|---|
| CN | 110769039 A | 2/2020 |
| CN | 111314464 A | 6/2020 |
| WO | WO-2016036289 A1 * 3/2016 ......... H04L 61/2007 |

OTHER PUBLICATIONS

International Search Report PCT/CN2020/125879 dated Jan. 27, 2021 (PCT/ISA/210).
Written Opinion of the International Searching Authority for PCT/CN2020/125879 dated Jan. 27, 2021 (PCT/ISA/237).

* cited by examiner

COMMUNICATION METHOD APPLIED TO EDGE COMPUTING SCENARIO, STORAGE MEDIUM, AND ELECTRONIC DEVICE

CROSS REFERENCE TO RELATED APPLICATION(S)

This application is a continuation application of International Application No. PCT/CN2020/125879, filed on Nov. 2, 2020, which claims priority to Chinese Patent Application No. 202010095909.5, filed with the China National Intellectual Property Administration on Feb. 17, 2020, the entire contents of which are incorporated by reference herein.

FIELD

The disclosure relates generally to the field of computer and communication technologies, and in particular, to a communication method applied to an edge computing scenario, a computer-readable storage medium, and an electronic device.

BACKGROUND

Mobile edge computing (MEC) provides users with required services and cloud computing functions nearby by using a radio access network through server nodes in an edge data network, to create a carrier-class service environment with high performance, low latency, and high bandwidth. Under the Internet service architecture conditions in the related art, service control nodes located in a central data network often cannot identify network locations of edge service nodes located in the edge data network, and consequently cannot manage the edge service nodes. As a result, it is difficult to achieve service processing with lower latency and higher efficiency through management and control of the edge data network.

SUMMARY

Embodiments provide a communication method applied to an edge computing scenario, a computer-readable storage medium, and an electronic device, which can implement identification of an edge service node by a central data network, and help the central data network achieve service processing with lower latency and higher efficiency through management of the edge service node.

According to an aspect of example embodiments, a method of an edge computing scenario performed by an edge control node, where an edge data network is deployed in the edge computing scenario, the edge data network is connected to a core network through a first user-plane function entity, the core network is connected to a central data network through a second user-plane function entity and a network address translation entity, and the edge control node and an edge service node are deployed in the edge data network, may include transmitting a network address assignment request to the network address translation entity after establishing a general packet radio service (GPRS) tunneling protocol (GTP) tunnel between the first user-plane function entity and the second user-plane function entity, such that the network address translation entity assigns a network address to the GTP tunnel, notifying the network address assigned by the network address translation entity to the GTP tunnel to the central data network, controlling a data packet to be transmitted by the edge service node to the central data network to be transmitted through the GTP tunnel, the network address translation entity replacing a source address of the data packet with the network address, and transmitting the data packet to the central data network after the data packet arrives at the network address translation entity.

According to an aspect of example embodiments, an apparatus in an edge computing scenario, where an edge data network is deployed in the edge computing scenario, the edge data network is connected to a core network through a first user-plane function entity, the core network is connected to a central data network through a second user-plane function entity and a network address translation entity, and the edge control node and an edge service node are deployed in the edge data network, may include at least one memory configured to store computer program code and at least one processor configured to access said computer program code and operate as instructed by the computer program code, the computer program code including first transmitting code configured to cause the at least one processor to transmit a network address assignment request to the network address translation entity after establishing a GTP tunnel between the first user-plane function entity and the second user-plane function entity, such that the network address translation entity assigns a network address to the GTP tunnel, first notifying code configured to cause the at least one processor to notify the network address assigned by the network address translation entity to the GTP tunnel to the central data network, first controlling code configured to cause the at least one processor to control a data packet to be transmitted by the edge service node to the central data network to be transmitted through the GTP tunnel, the network address translation entity replacing a source address of the data packet with the network address, and second transmitting code configured to cause the at least one processor to transmit the data packet to the central data network after the data packet arrives at the network address translation entity.

According to an aspect of example embodiments, a non-transitory computer-readable storage medium in an edge computing scenario, where an edge data network is deployed in the edge computing scenario, the edge data network is connected to a core network through a first user-plane function entity, the core network is connected to a central data network through a second user-plane function entity and a network address translation entity, and the edge control node and an edge service node are deployed in the edge data network, may store computer instructions that, when executed by at least one processor of a device, cause the at least one processor to transmit a network address assignment request to the network address translation entity after establishing a GTP tunnel between the first user-plane function entity and the second user-plane function entity, such that the network address translation entity assigns a network address to the GTP tunnel, notify the network address assigned by the network address translation entity to the GTP tunnel to the central data network, control a data packet to be transmitted by the edge service node to the central data network to be transmitted through the GTP tunnel, the network address translation entity replacing a source address of the data packet with the network address, and transmit the data packet to the central data network after the data packet arrives at the network address translation entity.

An embodiment of this application further provides a communication method applied to an edge computing scenario. An edge data network is deployed in the edge computing scenario. The edge data network is connected to a core network through a first user-plane function entity. The core network is connected to a central data network through a second user-plane function entity and a network address translation entity. An edge control node and an edge service node are deployed in the edge data network. The communication method is performed by the network address translation entity, including:

receiving a network address assignment request transmitted by the edge control node, the network address assignment request being used for requesting to assign a network address to a GTP tunnel established between the first user-plane function entity and the second user-plane function entity; transmitting the network address assigned to the GTP tunnel to the edge control node, so that the edge control node transmits the network address to the central data network; and in a case that a data packet that is from the edge service node and that is transmitted through the GTP tunnel is received, replacing a source address of the data packet with the network address and then transmitting the data packet to the central data network, so that the central data network identifies a source of the data packet based on the network address.

An embodiment of this application further provides a communication method applied to an edge computing scenario. An edge data network is deployed in the edge computing scenario. The edge data network is connected to a core network through a first user-plane function entity. The core network is connected to a central data network through a second user-plane function entity and a network address translation entity. An edge control node and an edge service node are deployed in the edge data network. The communication method is performed by the edge service node, including:

obtaining a data packet to be transmitted to the central data network; and transmitting the data packet to a GTP tunnel established between the first user-plane function entity and the second user-plane function entity, to transmit the data packet to the central data network through the GTP tunnel.

An embodiment of this application further provides a communication method applied to an edge computing scenario. An edge data network is deployed in the edge computing scenario. The edge data network is connected to a core network through a first user-plane function entity. The core network is connected to a central data network through a second user-plane function entity and a network address translation entity. An edge control node is deployed in the edge data network. The communication method is performed by the central data network, including:

receiving a network address transmitted by the edge control node, the network address being assigned by the network address translation entity to a GTP tunnel established between the first user-plane function entity and the second user-plane function entity; and in a case that a data packet that is from the GTP tunnel and that is transmitted by the network address translation entity is received, identifying whether the data packet is from the edge data network according to the network address and a source address of the data packet.

An embodiment of this application further provides a communication apparatus applied to an edge computing scenario. An edge data network is deployed in the edge computing scenario. The edge data network is connected to a core network through a first user-plane function entity. The core network is connected to a central data network through a second user-plane function entity and a network address translation entity. An edge control node and an edge service node are deployed in the edge data network. The communication apparatus is disposed inside the edge control node, including:

a first sending unit, configured to transmit a network address assignment request to the network address translation entity after a GTP tunnel is established between the first user-plane function entity and the second user-plane function entity, so that the network address translation entity assigns a network address to the GTP tunnel; and configured to notify the network address assigned by the network address translation entity to the GTP tunnel to the central data network; and a control unit, configured to control a data packet to be transmitted by the edge service node to the central data network to be transmitted through the GTP tunnel, the network address translation entity replacing a source address of the data packet with the network address and then transmitting the data packet to the central data network after the data packet arrives at the network address translation entity.

An embodiment of this application further provides a communication apparatus applied to an edge computing scenario. An edge data network is deployed in the edge computing scenario. The edge data network is connected to a core network through a first user-plane function entity. The core network is connected to a central data network through a second user-plane function entity and a network address translation entity. An edge control node and an edge service node are deployed in the edge data network. The communication apparatus is disposed inside the network address translation entity, including:

a first receiving unit, configured to receive a network address assignment request transmitted by the edge control node, the network address assignment request being used for requesting to assign a network address to a GTP tunnel established between the first user-plane function entity and the second user-plane function entity; a second sending unit, configured to transmit the network address assigned to the GTP tunnel to the edge control node, so that the edge control node transmits the network address to the central data network; and a first processing unit, configured to: in a case that a data packet that is from the edge service node and that is transmitted through the GTP tunnel is received, replace a source address of the data packet with the network address and then transmit the data packet to the central data network, so that the central data network identifies a source of the data packet based on the network address.

An embodiment of this application further provides a communication apparatus applied to an edge computing scenario. An edge data network is deployed in the edge computing scenario. The edge data network is connected to a core network through a first user-plane function entity. The core network is connected to a central data network through a second user-plane function entity and a network address translation entity. An edge control node and an edge service node are deployed in the edge data network. The communication apparatus is disposed inside the edge service node, including:

an obtaining unit, configured to obtain a data packet to be transmitted to the central data network; and a third sending unit, configured to transmit the data packet to a GTP tunnel established between the first user-plane function entity and the second user-plane function entity, to transmit the data packet to the central data network through the GTP tunnel.

An embodiment of this application further provides a communication apparatus applied to an edge computing scenario. An edge data network is deployed in the edge computing scenario. The edge data network is connected to a core network through a first user-plane function entity. The core network is connected to a central data network through a second user-plane function entity and a network address translation entity. An edge control node is deployed in the edge data network. The communication apparatus is disposed inside the central data network, including:

a third receiving unit, configured to receive a network address transmitted by the edge control node, the network address being assigned by the network address translation entity to a GTP tunnel established between the first user-plane function entity and the second user-plane function entity; and a second processing unit, configured to: in a case that a data packet that is from the GTP tunnel and that is transmitted by the network address translation entity is received, identify whether the data packet is from the edge data network according to the network address and a source address of the data packet.

An embodiment of this application further provides a computer-readable storage medium, storing a computer program, the computer program, when executed by a processor, implementing the communication method applied to an edge computing scenario according to the foregoing embodiment.

An embodiment of this application further provides an electronic device, including: one or more processors; and a memory, configured to store one or more programs, the one or more programs, when executed by the one or more processors, causing the one or more processors to implement the communication method applied to an edge computing scenario according to the foregoing embodiment.

The communication method applied to an edge computing scenario, the computer-readable storage medium, and the electronic device according to the embodiments of this application are applied. The edge control node transmits the network address assignment request to the network address translation entity after the GTP tunnel is established between the first user-plane function entity and the second user-plane function entity, notifies the network address assigned by the network address translation entity to the GTP tunnel to the central data network, so that the central data network can obtain the network address corresponding to the GTP tunnel, and further controls the data packet to be transmitted by the edge service node to the central data network to be transmitted through the GTP tunnel, so that the network address translation entity can replace the source address of the data packet with the network address and then transmit the data packet to the central data network after the data packet arrives at the network address translation entity. In this way, it can be ensured that the central data network determines the source of the data packet based on the network address of the data packet, to implement identification of the edge service node by the central data network, and help the central data network achieve service processing with lower latency and higher efficiency through management of the edge service node.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

Exemplary implementations are now described more comprehensively with reference to the accompanying drawings. However, the examples of implementations may be implemented in various forms, and it is not to be understood as being limited to the examples described herein. Conversely, the implementations are provided to make this disclosure more comprehensive and complete, and comprehensively convey the idea of the examples of the implementations to a person skilled in the art.

In addition, the described characteristics, structures, or features may be combined in one or more embodiments in any appropriate manner. In the following descriptions, a lot of details are provided to give a full understanding of the embodiments of this disclosure. However, a person skilled in the art is to be aware of that, the technical solutions in this disclosure may be implemented without one or more of the particular details, or other methods, unit, apparatus, or step may be adopted. In other cases, well-known methods, apparatuses, implementations, or operations are not shown or described in detail, to avoid obscuring the aspects of this disclosure.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
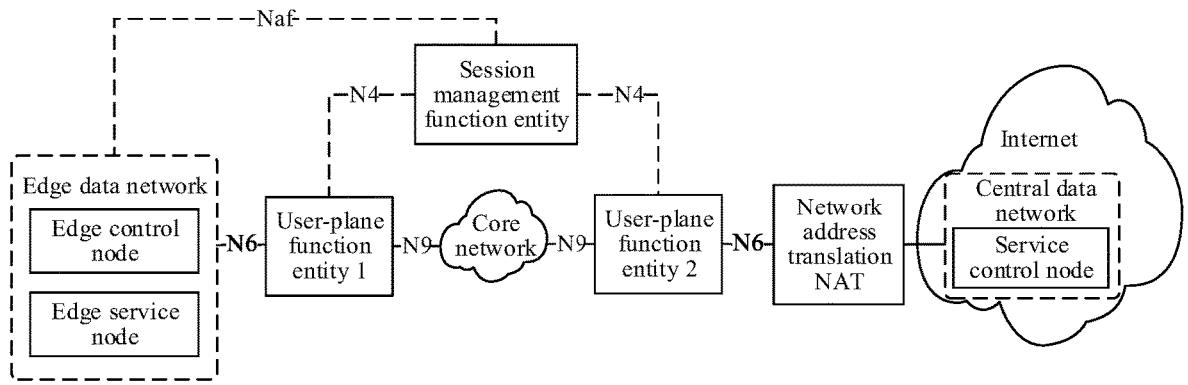
FIG. 1 is a diagram of an exemplary system architecture according to an embodiment.

FIG. 1 is a diagram of an exemplary system architecture according to an embodiment. As shown in FIG. 1, the system architecture may include an edge data network, a core network (where the core network may be a $5^{th}$ generation (5G) core network, or may be a $4^{th}$ generation (4G) core network, a later $6^{th}$ generation (6G) core network, or the like, and the 5G network is used as an example for description below), and a central data network. An edge control node and an edge service node are deployed in the edge data network, the edge data network is connected to a user-plane function (UPF) entity 1 through an N6 interface. The UPF entity 1 is connected to the core network through an N9 interface. The core network is connected to a UPF entity 2 through an N9 interface. The UPF entity 2 is connected to a network address translation (NAT) entity through an N6 interface. The NAT entity is connected to the central data network. The UPF entity 1 and the UPF entity 2 are configured to support forwarding service data between the core network and the edge data network or the central data network. A session management function (SMF) entity is configured to establish a general packet radio service (GPRS) tunneling protocol (GTP) tunnel used for transmitting data in the core network. The edge data network is controlled by the edge control node in an edge computing platform, and is responsible for providing a deployment operating environment for a service host (namely, the edge service node) at an edge of a base station. The central data network is deployed in the Internet, and is responsible for providing an operating environment for the service control node.

The edge data network is a private network, and does not have a capability of directly accessing the Internet, and the edge service node can access the core network only through the UPF entity 1. The edge control node may interact with the SMF entity through a Naf interface, and establish a data transmission GTP tunnel between the UPF entity 1 and the UPF entity 2. In the inside of the 5G network, there may be a plurality of edge data networks, which respectively independently operate a plurality of edge service nodes. The UPF entity 2 is connected to the external Internet through the NAT. This allows the edge service node to exchange data with the service control node by using a public network internet protocol (IP) address provided by the NAT.

In an embodiment of this disclosure, after deployment of the edge service node is completed in the edge data network, the edge control node first determines whether the GTP tunnel has been established between the UPF entity 1 and the UPF entity 2. If not, the edge control node requests the SMF entity to establish a GTP tunnel for connecting the UPF entity 1 and the UPF entity 2. Otherwise, the edge control node does not repeatedly request to establish a GTP tunnel.

After receiving the request from the edge control node, the SMF entity completes establishment of the GTP tunnel between the UPF entity 1 and the UPF entity 2 through an N4 interface, and informs the edge control node of a completion result. Afterwards, the edge control node assigns a specific sign to the GTP tunnel. During actual implementation, the edge control node requests the NAT to assign a fixed public network IP address to the GTP tunnel, and informs the service control node of the public network IP address. Then, the edge control node sets up internal routing in the edge data network, and routes a data packet transmitting from the edge service node to the central data network to the GTP tunnel between the UPF entity 1 and the UPF entity 2. Further, the edge control node instructs that the edge service node may start to normally work.

After normally starting to work, the edge service node reports status information thereof to the service control node (for example, a work load status or a network status) or directly sends a service packet. The data packet sent from the edge service node is first delivered into the GTP tunnel between the UPF entity 1 and the UPF entity 2 through the internal routing in the edge data network, and then is forwarded by the 5G core network to the UPF entity 2 through the GTP tunnel.

After extracting the data packet of the edge service node from the GTP tunnel, the UPF entity 2 then delivers the data packet into the NAT. A source IP address of the data packet is replaced with a public network IP address requested by the edge control node to assign in the NAT. Then, the data packet after completion of the address replacement is received by the service control node in the central data network through the Internet. Because the edge control node informs the service control node of the public network IP address in advance, the service control node can determine that the data packet comes from a specific edge data network, thereby identifying a specific location of the edge service node in the 5G network.

In an embodiment of this disclosure, after identifying the specific location of the edge service node in the 5G network, the central data network can achieve service processing with lower latency and higher efficiency through management of the edge service node.

Figure 2:
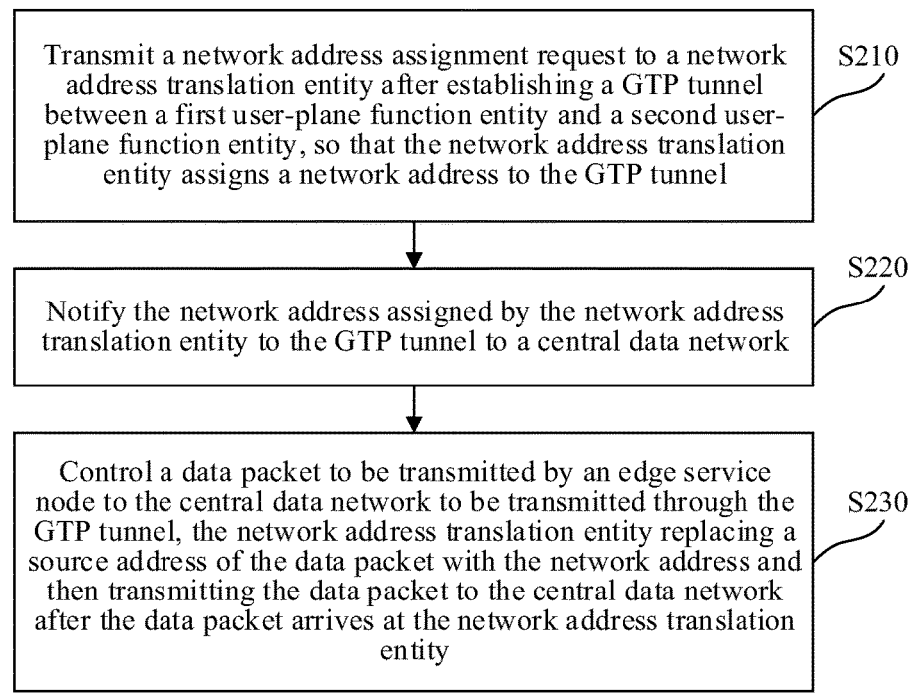
FIG. 2 is a flowchart of a communication method applied to an edge computing scenario according to an embodiment.

FIG. 2 is a flowchart of a communication method applied to an edge computing scenario according to an embodiment. The edge computing scenario may be the edge computing scenario shown in FIG. 1, and the communication method applied to the edge computing scenario may be performed by an edge control node shown in FIG. 1. Referring to FIG. 2, the communication method includes at least operation S210 to operation S230, and detailed descriptions are provided below:

In operation S210, after establishing a GTP tunnel between a first UPF entity and a second UPF entity, the edge control node transmits a network address assignment request to a NAT entity, so that the NAT entity assigns a network address to the GTP tunnel.

In an embodiment of this disclosure, the edge control node may communicate with the NAT entity through the core network, to transmit the network address assignment request to the NAT entity. After assigning the network address to the GTP tunnel, the NAT entity may return the network address to the edge control node.

In an embodiment of this disclosure, before the network address assignment request is transmitted to the NAT entity, if it is detected that the GTP tunnel is not established between the first UPF entity and the second UPF entity, a tunnel establishment request is transmitted to a SMF entity, so that the SMF entity establishes the GTP tunnel.

In operation S220, the network address assigned by the NAT entity to the GTP tunnel is notified to the central data network.

In an embodiment of this disclosure, after the edge control node notifies the network address assigned by the NAT entity to the GTP tunnel to the central data network, the central data network may determine a specific edge data network that a data packet is from according to a network address of the received data packet.

In operation S230, the data packet to be transmitted by the edge service node to the central data network is controlled to be transmitted through the GTP tunnel, the NAT entity replacing a source address of the data packet with the network address and then transmitting the data packet to the central data network after the data packet arrives at the NAT entity.

In an embodiment of this disclosure, the edge control node may set up internal routing in the edge data network, the internal routing being used for routing the data packet to be transmitted by the edge service node to the central data network to the GTP tunnel, to further transmit the data packet to the central data network through the GTP tunnel.

According to the technical solution in the embodiment shown in FIG. 2, it may be ensured that the central data network determines a source of the data packet based on the network address of the received data packet. This implements identification of the edge service node by the central data network, and helps the central data network achieve service processing with lower latency and higher efficiency through management of the edge service node.

Figure 3:
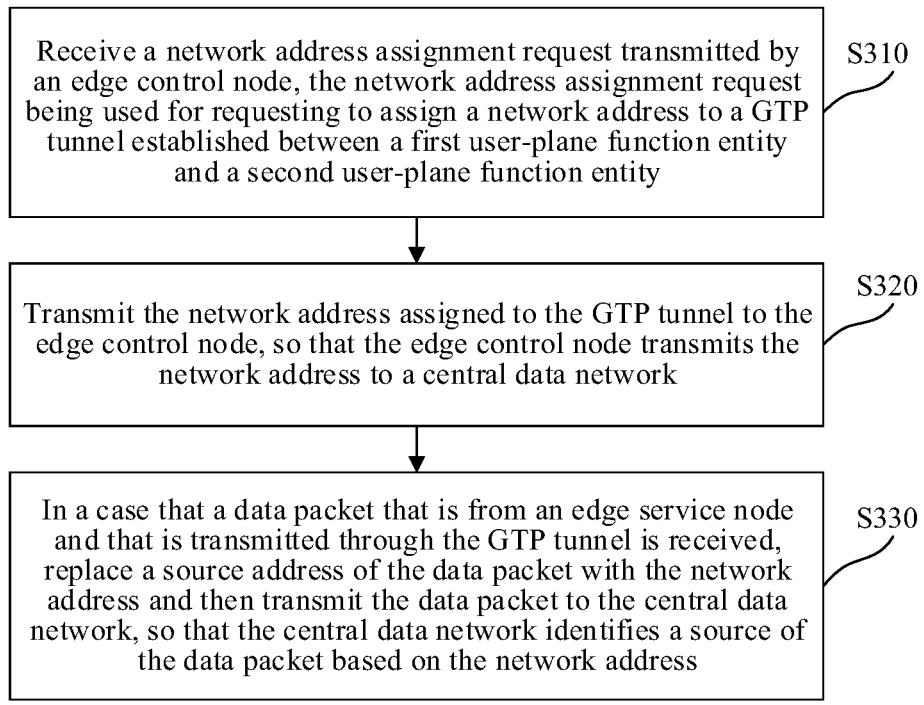
FIG. 3 is a flowchart of a communication method applied to an edge computing scenario according to an embodiment.

FIG. 3 is a flowchart of a communication method applied to an edge computing scenario according to an embodiment. The edge computing scenario may be the edge computing scenario shown in FIG. 1, and the communication method applied to the edge computing scenario may be performed by the NAT entity shown in FIG. 1. Referring to FIG. 3, the communication method includes at least operation S310 to operation S330, and detailed descriptions are provided below:

In operation S310, the NAT entity receives a network address assignment request transmitted by an edge control node, the network address assignment request being used for requesting to assign a network address to a GTP tunnel established between a first UPF entity and a second UPF entity.

In an embodiment of this disclosure, the edge control node may interact with the NAT entity through a core network, to request the NAT entity to assign the network address to the GTP tunnel.

In operation S320, the network address assigned to the GTP tunnel is transmitted to the edge control node, so that the edge control node transmits the network address to the central data network.

In an embodiment of this disclosure, the NAT entity may transmit, through a core network, the network address assigned to the GTP tunnel to the edge control node.

In operation S330, based on a data packet that is from the edge service node and that is transmitted through the GTP tunnel being received, a source address of the data packet is replaced with the network address and then the data packet is transmitted to the central data network, so that the central data network identifies a source of the data packet based on the network address.

In an embodiment of this disclosure, the edge control node already transmits the network address assigned to the GTP tunnel to the central data network. Therefore, a source address of the data packet is replaced with the network address assigned to the GTP tunnel and then the data packet is transmitted to the central data network, so that the central data network can determine whether the data packet is from the edge data network based on the network address.

In an embodiment of this disclosure, after the source address of the data packet is replaced with the network address and the data packet is transmitted to the central data network, based on a response message that is for the data packet and that is fed back by the central data network being received, a destination address of the response message is replaced with an address specified by the edge service node, to obtain a processed response message, and then the processed response message is transmitted to the second UPF entity, so that the second UPF entity transmits the processed response message to the edge service node through the GTP tunnel.

According to the technical solution in the embodiment shown in FIG. 3, it may be ensured that the central data network determines a source of the data packet based on the network address of the received data packet. This implements identification of the edge service node by the central data network, and helps the central data network achieve service processing with lower latency and higher efficiency through management of the edge service node.

Figure 4:
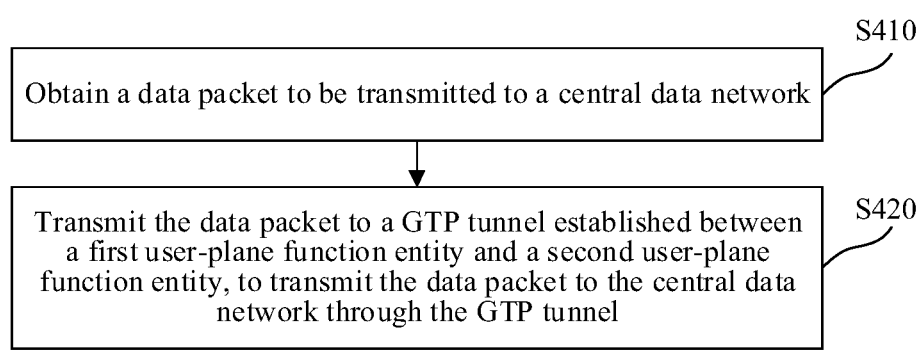
FIG. 4 is a flowchart of a communication method applied to an edge computing scenario according to an embodiment.

FIG. 4 is a flowchart of a communication method applied to an edge computing scenario according to an embodiment. The edge computing scenario may be the edge computing scenario shown in FIG. 1, and the communication method applied to the edge computing scenario may be performed by an edge service node shown in FIG. 1. Referring to FIG. 4, the communication method includes at least operation S410 to operation S420, and detailed descriptions are provided below:

In operation S410, the edge service node obtains a data packet to be transmitted to a central data network.

In an embodiment of this disclosure, the data packet to be transmitted by the edge service node to the central data network may be a status data packet of the edge service node, and the status data packet is used for the central data network to determine a service capability of the edge service node, and an edge data network in which the edge service node is located. In some embodiments, the data packet to be transmitted by the edge service node to the central data network may further be a service access request data packet.

In step S420, the data packet is transmitted to a GTP tunnel established between a first UPF entity and a second UPF entity, to transmit the data packet to the central data network through the GTP tunnel.

In an embodiment of this disclosure, if the data packet to be transmitted from the edge service node to the central data network is a service access request data packet from a terminal device, the service access request data packet may be marked before the service access request data packet is transmitted to the GTP tunnel established between the first UPF entity and the second UPF entity, to indicate that the edge data network can serve the terminal device, and further the central data network may assign the edge service node located in the edge data network to process the service access request data packet.

In an embodiment of this disclosure, if the data packet to be transmitted from the edge service node to the central data network is a service access request data packet from a terminal device, the edge service node may further receive a response message that is for the service access request data packet and that is returned by the central data network through the GTP tunnel, the response message including an identifier of a target service node selected by the central data network from the edge data network, and may further forward the response message to the terminal device, so that the terminal device initiates a service connection request according to the identifier of the target service node. In some embodiments, the target service node and the edge service node receiving the service access request data packet may be different service nodes.

In an embodiment of this disclosure, if the edge service node is selected by the central data network as a target service node for responding to a service connection request of a terminal device, when receiving the service connection request sent by the terminal device, the edge service node may generate a service connection response for the service connection request, and then feeds back the service connection response to the terminal device, to establish a service session with the terminal device. After establishing the service session, the target service node may respond to a service request of the terminal device.

According to the technical solution in the embodiment shown in FIG. 4, the edge service node may transmit the data packet to the central data network through the established GTP tunnel, and further the central data network may assign an appropriate edge service node for a response based on an identified source of the data packet. This helps the central data network achieve service processing with lower latency and higher efficiency through management of the edge service node.

Figure 5:
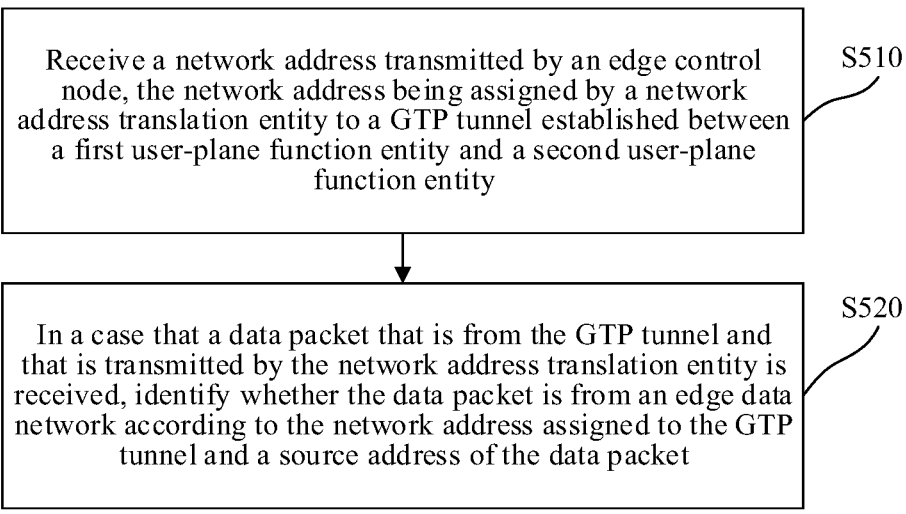
FIG. 5 is a flowchart of a communication method applied to an edge computing scenario according to an embodiment.

FIG. 5 is a flowchart of a communication method applied to an edge computing scenario according to an embodiment. The edge computing scenario may be the edge computing scenario shown in FIG. 1, and the communication method applied to the edge computing scenario may be performed by the central data network shown in FIG. 1, for example, performed by the service control node in the central data network. Referring to FIG. 5, the communication method includes at least operation S510 to operation S520, and detailed descriptions are provided below:

In operation S510, a network address transmitted by an edge control node is received, the network address being assigned by a NAT entity to a GTP tunnel established between a first UPF entity and a second UPF entity.

In operation S520, based on a data packet that is from the GTP tunnel and that is transmitted by the NAT entity being received, whether the data packet is from the edge data network is identified according to the network address assigned to the GTP tunnel and a source address of the data packet.

In an embodiment of this disclosure, the NAT entity assigns a network address in advance to a GTP tunnel established between a first UPF entity and a second UPF entity. When receiving the data packet transmitted through the GTP tunnel, the NAT entity may replace the source address of the data packet with the network address assigned to the GTP tunnel, and the edge control node transmits the network address to the central data network. Therefore, after receiving the data packet, the central data network may identify whether the data packet is from the edge data network based on the source address of the data packet and the network address assigned to the GTP tunnel.

In an embodiment of this disclosure, if the data packet received by the central data network is a status data packet sent by the edge service node, the central data network determines that a network location of the edge service node is located in the edge data network during identifying that the data packet is from the edge data network according to the network address assigned to the GTP tunnel and the source address of the data packet. In some embodiments, if the network address assigned to the GTP tunnel matches the source address of the data packet, it may be determined that the data packet is from the edge data network.

In an embodiment of this disclosure, if the data packet received by the central data network is a service access request sent by the edge service node deployed in the edge data network, during identifying that the data packet is from the edge data network according to the network address and the source address of the data packet, the central data network may select a target service node deployed in edge service nodes in the edge data network, then generate a response request for the service access request according to an identifier of the target service node, and transmit the response message to the NAT entity, so that the NAT entity transmits the response message to the edge data network through the GTP tunnel.

According to the technical solution in the embodiment shown in FIG. 5, it may be ensured that the central data network determines a source of the data packet based on the network address of the received data packet. This implements identification of the edge service node by the central data network, and helps the central data network achieve service processing with lower latency and higher efficiency through management of the edge service node.

The communication method applied to the edge computing scenario according to the embodiments of this disclosure is described separately from perspectives of the edge control node, the NAT entity, the edge service node, and the central data network (for example, the service control node in the central data network). The following describes a process of interaction between the entities in the embodiments of this disclosure with reference to FIG. 1 and FIG. 6:

In an embodiment of this disclosure, based on the system architecture shown in FIG. 1, the edge service node may enable the service control node to find the network location of the edge service node in a manner of reporting status information to the service control node, which may include the following process:

1. The edge control node completes deployment of the edge service node in the edge data network. The edge data network is connected to a 5G core network (where a 5G network is used as an example for description in the embodiment) through a UPF entity 1, and the 5G core network is connected to the Internet through a UPF entity 2 and a NAT entity.

2. The edge control node requests a SMF entity to establish a GTP tunnel between the UPF 1 and the UPF 2.

3. After establishment of the GTP tunnel is completed, the edge control node requests the NAT to assign a fixed public network IP address to the data packet sent from the GTP tunnel.

4. The edge control node notifies, to the service control node, the public network IP address assigned by the NAT.

5. The edge control node sets up internal routing in the edge data network, and delivers the data packet sent from the edge service node to an external Internet host (including the service control node) to the established GTP tunnel.

6. The edge control node notifies the edge service node to start normal work.

7. The edge service node sends a status information data packet thereof to the service control node.

8. The edge data network delivers, into the established GTP tunnel through internal routing, the status information data packet sent from the edge service node.

9. The 5G core network forwards, through the GTP tunnel, the status information data packet sent by the edge service node to the UPF 2.

10. The UPF 2 extracts, through the GTP tunnel, the status information data packet sent by the edge service node, and forwards the status information data packet to a specific port of the NAT.

11. The NAT replaces a source IP address and a port of the status information data packet received from the edge service node.

12. The NAT sends the data packet whose address and port are replaced to the service control node in the Internet.

13. The service control node receives the data packet forwarded by the NAT, and determines that the data packet is from a specific edge data network according to the public network IP address informed by the edge control node in advance, thereby completing identification of the network location of the edge service node.

Figure 6:
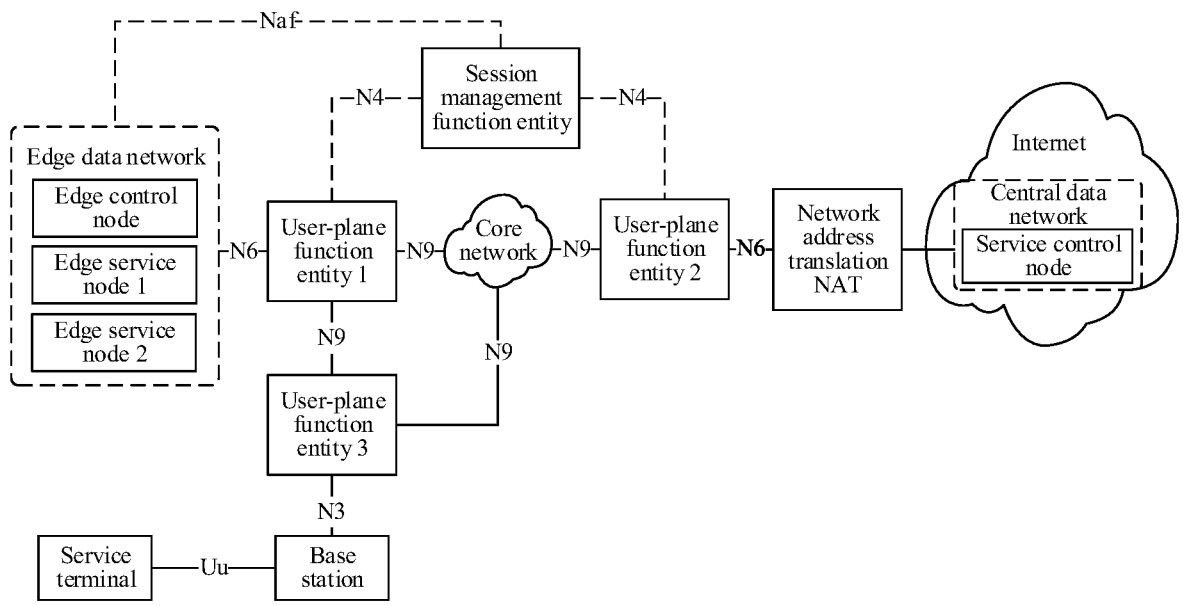
FIG. 6 is a diagram of an exemplary system architecture according to an embodiment.

In an embodiment of this disclosure, after the service control node completes the identification of the network location of the edge service node, in a system architecture shown in FIG. 6, a process in which the edge service node collaborates with the service control node includes the following process:

1. The edge control node completes deployment of two edge service nodes in the edge data network (where a quantity of the edge service nodes is merely an example, and more edge service nodes may be deployed according to other embodiments of this disclosure). An edge service node 1 marks a service access request of a service terminal, and an edge service node 2 actually responds to the service connection request of the service terminal.

2. The edge control node requests an SMF to establish a GTP tunnel between a UPF 1 and a UPF 2.

3. After establishment of the GTP tunnel is completed, the edge control node requests the NAT to assign a fixed public network IP address to the data packet sent from the GTP tunnel.

4. The edge control node notifies, to the service control node, the public network IP address assigned by the NAT.

5. The edge control node sets up internal routing in the edge data network, and delivers the data packet sent from the edge service node to an external Internet host (including the service control node) to the established GTP tunnel.

6. The edge control node notifies the edge service node to start normal work.

7. The service terminal initiates the service access request through a Uu interface.

8. A UPF entity 3 (UPF 3) forwards the service access request to the UPF 1. The UPF 3 serves as an uplink (UL) classifier (CL).

9. The UPF 1 forwards the service access request to the edge service node 1.

10. The edge service node 1 marks the service access request. An objective of performing marking by the edge service node 1 is to inform the service control node that the edge data network can process the service access request.

11. The edge service node 1 sends the marked service access request to the service control node.

12. The edge data network delivers, into the established GTP tunnel through internal routing, the service access request sent from the edge service node 1.

13. A 5G core network forwards, to the UPF 2 through the GTP tunnel, the service access request sent from the edge service node 1.

14. The UPF 2 extracts the service access request of the edge service node 1 from the GTP tunnel, and forwards the service access request to a specific port of the NAT.

15. The NAT replaces a source IP address and a port of the service access request received from the edge service node 1.

16. The NAT sends the service access request whose address and port are replaced to the Internet.

17. The service control node receives the service access request forwarded by the NAT, and determines that the service access request is from a specific edge data network according to the public network IP address informed by the edge control node in advance.

18. If identifying, based on a determined edge data network, that the edge service node 2 may be used for processing the service request, the service control node returns an IP address of the edge service node 2 as a request response.

19. The request response returned by the service control node arrives at the NAT, and a destination IP address and a destination port of the request response are replaced with an original address and port specified by the edge service node 1.

20. The NAT forwards the request response whose address and port are replaced to the UPF 2.

21. The UPF 2 delivers the request response into the GTP tunnel.

22. The request response is forwarded by the 5G core network through the GTP tunnel and arrives at the UPF 1.

23. The UPF 1 extracts the request response from the GTP tunnel, and forwards the request response to the inside of the edge data network.

24. The edge data network forwards, through internal routing, the request response to the edge service node 1.

25. The edge service node 1 forwards the request response to the UPF 3.

26. The UPF 3 forwards the request response to the service terminal.

27. The service terminal extracts the IP address of the edge service node 2 from the request response.

28. The service terminal initiates a service connection request to the edge service node 2.

29. The service connection request sent by the service terminal arrives at the UPF 3.

30. The UPF 3 forwards the service connection request to the UPF 1.

31. The UPF 1 forwards the service connection request to the edge data network.

32. The edge data network forwards, through internal routing, the service connection request to the edge service node 2.

33. After receiving the service connection request, the edge service node 2 returns a service connection response to the service terminal.

34. The service connection response sent by the edge service node 2 is forwarded to the UPF 1 by the edge data network through internal routing.

35. The UPF 1 forwards the service connection response to the UPF 3.

36. The UPF 3 forwards the service connection response to the service terminal through a base station.

37. After receiving the service connection response, the service terminal completes service connection establishment and may further start a service session.

The technical solution according to the foregoing embodiment of this disclosure may be based on an existing 5G network architecture, and low-latency service access can be achieved through the edge service node built into the 5G network without disrupting a basic service logic of an Internet service and with simply modifying the front end of the Internet service. In addition, the technical solution according to this embodiment of this disclosure may alternatively be based on an existing Internet service management frame, and the 5G edge service node is remotely located and managed.

The following describes an apparatus embodiment of this disclosure, which may be used to perform the communication method applied to the edge computing scenario according to the foregoing embodiments of this disclosure. For details not disclosed in the apparatus embodiment of this disclosure, refer to the embodiment of the communication method applied to the edge computing scenario described above in this disclosure.

Figure 7:
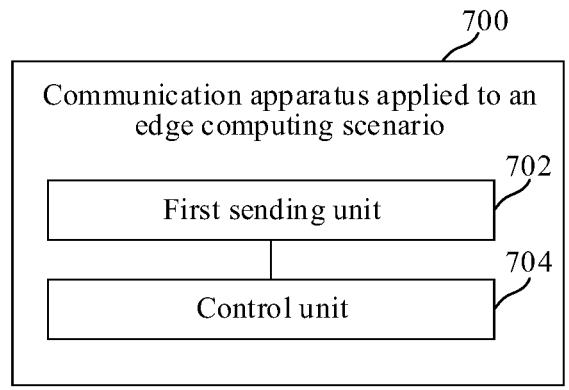
FIG. 7 is a diagram of a communication apparatus applied to an edge computing scenario according to an embodiment.

FIG. 7 is a block diagram of a communication apparatus applied to an edge computing scenario according to an embodiment. The edge computing scenario may be the edge computing scenario shown in FIG. 1, and the communication apparatus applied to the edge computing scenario may be disposed in an edge control node.

Referring to FIG. 7, a communication apparatus 700 applied to an edge computing scenario according to an embodiment includes: a first sending unit 702 and a control unit 704.

The first sending unit 702 is configured to transmit a network address assignment request to a NAT entity after a GTP tunnel is established between a first UPF entity and a second UPF entity, so that the NAT entity assigns a network address to the GTP tunnel; and is configured to notify the network address assigned by the NAT entity to the GTP tunnel to the central data network.

The control unit 704 is configured to control a data packet to be transmitted by an edge service node to a central data network to be transmitted through the GTP tunnel, the NAT entity replacing a source address of the data packet with the network address and then transmitting the data packet to the central data network after the data packet arrives at the NAT entity.

In some embodiments of this disclosure, the first sending unit 702 is further configured to, before the network address assignment request is transmitted to the NAT entity, if it is detected that the GTP tunnel is not established between the first UPF entity and the second UPF entity, transmit a tunnel establishment request to a SMF entity, so that the SMF entity establishes the GTP tunnel.

In some embodiments of this disclosure, the control unit 704 is configured to: set up internal routing in the edge data network, the internal routing being used for routing the data packet to be transmitted by the edge service node to the central data network to the GTP tunnel.

Figure 8:
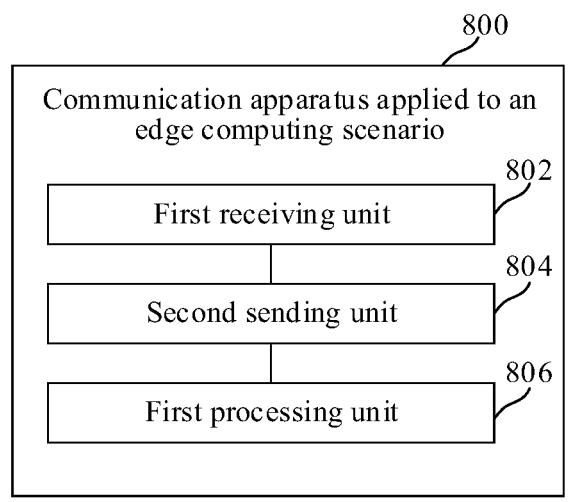
FIG. 8 is a diagram of a communication apparatus applied to an edge computing scenario according to an embodiment.

FIG. 8 is a block diagram of a communication apparatus applied to an edge computing scenario according to an embodiment. The edge computing scenario may be the edge computing scenario shown in FIG. 1, and the communication apparatus applied to the edge computing scenario may be disposed in a NAT entity.

Referring to FIG. 8, a communication apparatus 800 applied to an edge computing scenario according to an embodiment includes: a first receiving unit 802, a second sending unit 804, and a first processing unit 806.

The first receiving unit 802 is configured to receive a network address assignment request transmitted by an edge control node, the network address assignment request being used for requesting to assign a network address to a GTP tunnel established between a first UPF entity and a second UPF entity. The second sending unit 804 is configured to transmit the network address assigned to the GTP tunnel to the edge control node, so that the edge control node transmits the network address to a central data network. The first processing unit 806 is configured to, based on a data packet that is from the edge service node and that is transmitted through the GTP tunnel being received, replace a source address of the data packet with the network address and then transmit the data packet to the central data network, so that the central data network identifies a source of the data packet based on the network address.

In some embodiments of this disclosure, the first processing unit 806 is further configured to, after the source address of the data packet is replaced with the network address and the data packet is transmitted to the central data network, based on a response message that is for the data packet and that is fed back by the central data network being received, replace a destination address of the response message with an address specified by the edge service node, to obtain a processed response message, and transmit the processed response message to the second UPF entity, so that the second UPF entity transmits the processed response message to the edge service node through the GTP tunnel.

Figure 9:
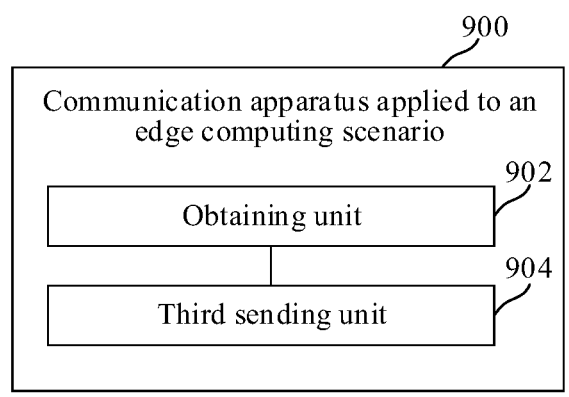
FIG. 9 is a diagram of a communication apparatus applied to an edge computing scenario according to an embodiment.

FIG. 9 is a block diagram of a communication apparatus applied to an edge computing scenario according to an embodiment. The edge computing scenario may be the edge computing scenario shown in FIG. 1, and the communication apparatus applied to the edge computing scenario may be disposed in an edge service node.

Referring to FIG. 9, a communication apparatus 900 applied to an edge computing scenario according to an embodiment includes: an obtaining unit 902 and a third sending unit 904.

The obtaining unit 902 is configured to obtain a data packet to be transmitted to a central data network. The third sending unit 904 is configured to transmit the data packet to a GTP tunnel established between a first UPF entity and a second UPF entity, to transmit the data packet to the central data network through the GTP tunnel.

In some embodiments of this disclosure, the data packet includes a status data packet of the edge service node, and the status data packet is used for the central data network to determine a service capability of the edge service node and an edge data network in which the edge service node is located.

In some embodiments of this disclosure, the data packet includes a service access request data packet from a terminal device. The communication apparatus 900 further includes: a second receiving unit, configured to receive a response message that is for the data packet and that is returned by the central data network through the GTP tunnel, the response message including an identifier of a target service node selected by the central data network from the edge data network. The third sending unit 904 is further configured to forward the response message to the terminal device, so that the terminal device initiates a service connection request according to the identifier of the target service node.

In some embodiments of this disclosure, the data packet includes a service access request data packet from a terminal device. The third sending unit 904 is further configured to mark the service access request data packet before transmitting the data packet to the GTP tunnel established between the first UPF entity and the second UPF entity, the marking being used for indicating that the edge data network can serve the terminal device.

In some embodiments of this disclosure, the communication apparatus 900 applied to the edge computing scenario further includes: a generation unit, configured to, based on a service connection request transmitted by the terminal device being received, generate a service connection response for the service connection request; and the third sending unit 904 is further configured to feed back the service connection response to the terminal device, to establish a service session with the terminal device.

Figure 10:
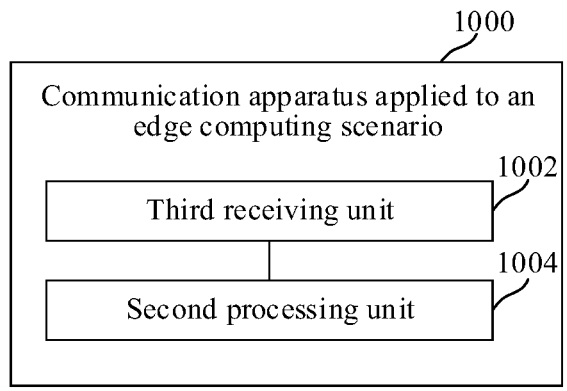
FIG. 10 is a diagram of a communication apparatus applied to an edge computing scenario according to an embodiment.

FIG. 10 is a block diagram of a communication apparatus applied to an edge computing scenario according to an embodiment. The edge computing scenario may be the edge computing scenario shown in FIG. 1, and the communication apparatus applied to the edge computing scenario may be disposed in a central data network.

Referring to FIG. 10, a communication apparatus 1000 applied to an edge computing scenario according to an embodiment includes: a third receiving unit 1002 and a second processing unit 1004.

The third receiving unit 1002 is configured to receive a network address transmitted by an edge control node, the network address being assigned by a NAT entity to a GTP tunnel established between a first UPF entity and a second UPF entity. The second processing unit 1004 is configured to, based on a data packet that is from the GTP tunnel and that is transmitted by the NAT entity being received, identify whether the data packet is from the edge data network according to the network address and a source address of the data packet.

In some embodiments of this disclosure, the data packet includes a status data packet transmitted by an edge service node deployed in the edge data network. The second processing unit 1004 is configured to determine that a network location of the edge service node is located in the edge data network during identifying that the data packet is from the edge data network according to the network address and the source address of the data packet.

In some embodiments of this disclosure, the data packet includes a service access request transmitted by an edge service node deployed in the edge data network. The second processing unit 1004 is further configured to select a target service node from edge service nodes deployed in the edge data network during identifying that the data packet is from the edge data network according to the network address and the source address of the data packet; and generate a response message for the service access request according to an identifier of the target service node, and transmit the response message to the NAT entity, so that the NAT entity transmits the response message to the edge data network through the GTP tunnel.

Figure 11:
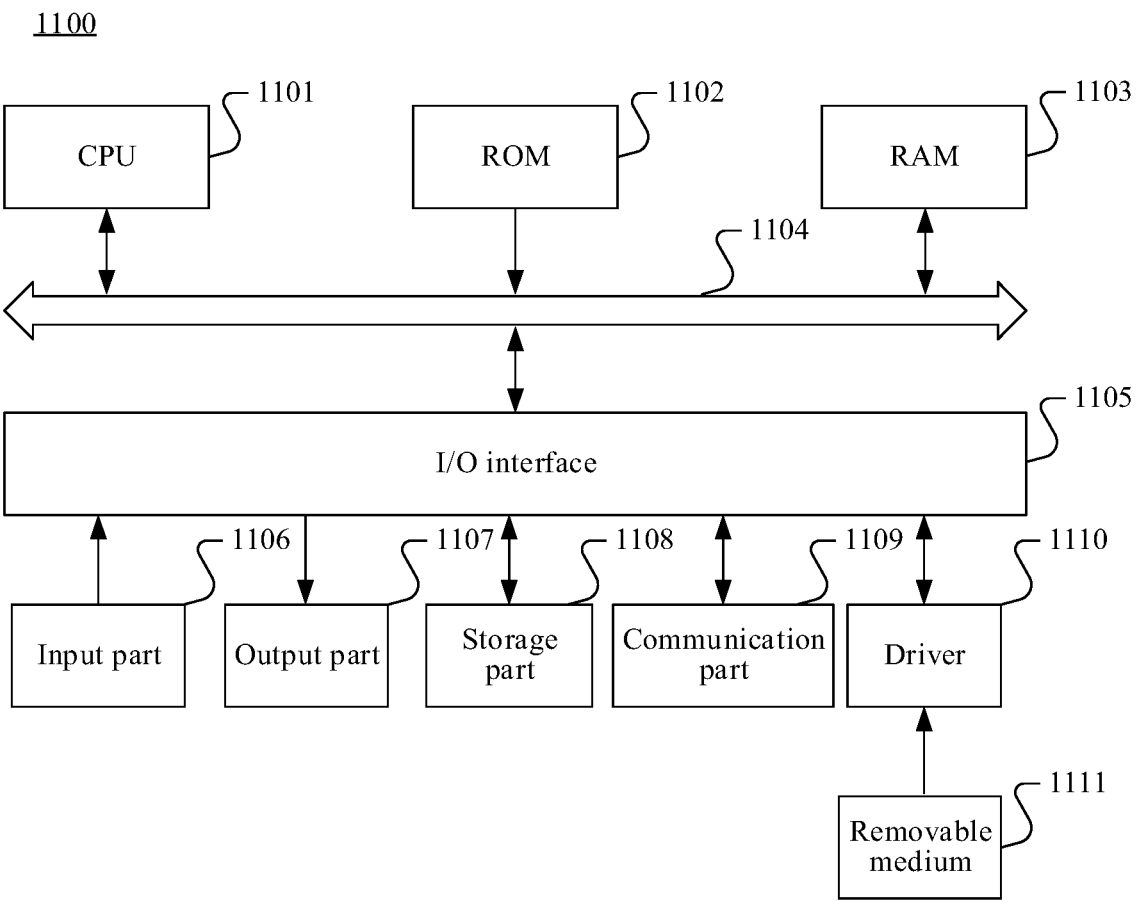
FIG. 11 is a diagram of a computer system of an electronic device according to an embodiment.

FIG. 11 is a schematic structural diagram of a computer system adapted to implement an electronic device according to an embodiment.

A computer system 1100 of the electronic device shown in FIG. 11 is merely an example, and does not constitute any limitation on functions and use ranges of the embodiments of this disclosure.

As shown in FIG. 11, the computer system 1100 includes a central processing unit (CPU) 1101, which may perform various suitable actions and processing based on a program stored in a read-only memory (ROM) 1102 or a program loaded from a storage part 1108 into a random access memory (RAM) 1103, for example, perform the method described in the foregoing embodiments. The RAM 1103 further stores various programs and data required for system operations. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard and a mouse, etc.; an output part 1107 including a cathode ray tube (CRT), a liquid crystal display (LCD), and a speaker, etc.; a storage part 1108 including hard disk, etc.; and a communication part 1109 including a network interface card such as a local area network (LAN) card or a modem, etc. The communication part 1109 performs communication processing by using a network such as the Internet. A driver 1110 is also connected to the I/O interface 1105 as required. A removable medium 1111, such as a magnetic disk, an optical disc, a magneto-optical disk, or a semiconductor memory, is installed on the driver 1110 as required, so that a computer program read from the removable medium is installed into the storage part 1108 as required.

Particularly, according to an embodiment, the processes described above by referring to the flowcharts may be implemented as computer software programs. For example, an embodiment of this disclosure includes a computer program product. The computer program product includes a computer program stored in a computer-readable storage medium. The computer program includes a computer program used for performing a method shown in the flowchart. In such an embodiment, by using the communication part 1109, the computer program may be downloaded and installed from a network, and/or installed from the removable medium 1111. When the computer program is executed by the CPU 1101, the various functions defined in the system of this disclosure are executed.

The computer-readable storage medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. An example of the computer-readable storage medium may include, but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, apparatus, or device. In this disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may alternatively be any computer-readable storage medium other than the computer-readable storage medium. The computer-readable storage medium may send, propagate, or transmit a program for use by or in combination with an instruction execution system, apparatus, or device. The computer program included in the computer-readable storage medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this disclosure may be implemented in a software manner, or may be implemented in a hardware manner, and the unit described can also be set in a processor. Names of the units do not constitute a limitation on the units in a specific case.

This disclosure further provides a computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, features and functions of one module or unit described above may be further divided into a plurality of modules or units to be specified.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this disclosure may be implemented in a form of a software product. The software product may be stored in a non-volatile storage medium (which may be a CD-ROM, a universal serial bus (USB) flash drive, a removable hard disk, or the like) or on the network, including several instructions for instructing a computing device (which may be a personal computer, a server, a touch terminal, a network device, or the like) to perform the methods according to the embodiments of this disclosure.

What is claimed is:

1. A communication method in an edge computing scenario performed by an edge control node, wherein an edge data network is deployed in the edge computing scenario, the edge data network is connected to a core network through a first user-plane function entity, the core network is connected to a central data network through a second user-plane function entity and a network address translation entity, and the edge control node and an edge service node are deployed in the edge data network, the method comprising:
transmitting a network address assignment request to the network address translation entity after establishing a general packet radio service (GPRS) tunneling protocol (GTP) tunnel between the first user-plane function entity and the second user-plane function entity, the network address translation entity thereby assigning a network address to the GTP tunnel;
notifying the network address assigned by the network address translation entity to the GTP tunnel to the central data network;
controlling a data packet to be transmitted by the edge service node to the central data network to be transmitted through the GTP tunnel, the network address translation entity thereby replacing a source address of the data packet with the network address; and
transmitting the data packet to the central data network after the data packet arrives at the network address translation entity.

2. The method of claim 1, further comprising:
before transmitting the network address assignment request to the network address translation entity, transmitting a tunnel establishment request to a session management function entity in a case that it is detected that the GTP tunnel is not established between the first user-plane function entity and the second user-plane function entity, so that the session management function entity establishes the GTP tunnel.

3. The method of claim 1, wherein the controlling the data packet to be transmitted by the edge service node to the central data network to be transmitted through the GTP tunnel comprises:
setting up internal routing in the edge data network, the internal routing configured for routing the data packet to be transmitted by the edge service node to the central data network to the GTP tunnel.

4. The method of claim 1, further comprising:
receiving the network address assignment request transmitted by the edge control node, the network address assignment request configured for requesting to assign the network address to the GTP tunnel established between the first user-plane function entity and the second user-plane function entity;
transmitting the network address assigned to the GTP tunnel to the edge control node, such that the edge control node transmits the network address to the central data network; and
based on the data packet being received, replacing the source address of the data packet with the network address and then transmitting the data packet to the central data network, so that the central data network identifies a source of the data packet based on the network address.

5. The method of claim 4, further comprising:
after the replacing the source address of the data packet with the network address and then transmitting the data packet to the central data network, based on a response message that is for the data packet and that is fed back by the central data network being received, replacing a destination address of the response message with an address specified by the edge service node, to obtain a processed response message; and
transmitting the processed response message to the second user-plane function entity, such that the second user-plane function entity transmits the processed response message to the edge service node through the GTP tunnel.

6. The method of claim 1, further comprising:
obtaining the data packet to be transmitted to the central data network; and
transmitting the data packet to the GTP tunnel established between the first user-plane function entity and the second user-plane function entity, to transmit the data packet to the central data network through the GTP tunnel.

7. The method according to claim 6, wherein the data packet comprises a status data packet of the edge service node, and
wherein the status data packet is configured to be used for the central data network to determine a service capability of the edge service node and the edge data network in which the edge service node is located.

8. The method according to claim 6, wherein the data packet comprises a service access request data packet from a terminal device; and wherein the method further comprises:
receiving a response message that is for the data packet and that is returned by the central data network through the GTP tunnel, wherein the response message comprises an identifier of a target service node selected by the central data network from the edge data network; and
forwarding the response message to the terminal device, such that the terminal device initiates a service connection request according to the identifier of the target service node.

9. The method according to claim 6, wherein the data packet comprises a service access request data packet from a terminal device; and
the method further comprises marking the service access request data packet before transmitting the data packet to the GTP tunnel established between the first user-plane function entity and the second user-plane function entity, the marking being configured for indicating that the edge data network can serve the terminal device.

10. The method according to claim 6, further comprising:
based on a service connection request transmitted by a terminal device being received, generating a service connection response for the service connection request; and
feeding back the service connection response to the terminal device, to establish a service session with the terminal device.

11. The method of claim 1, further comprising:
receiving the network address transmitted by the edge control node; and
based on the data packet that is from the GTP tunnel and that is transmitted by the network address translation entity being received, identifying whether the data packet is from the edge data network according to the network address and the source address of the data packet.

12. The method according to claim 11, wherein the data packet comprises a status data packet transmitted by the edge service node deployed in the edge data network; and
the method further comprises determining that a network location of the edge service node is located in the edge data network during identifying that the data packet is from the edge data network according to the network address and the source address of the data packet.

13. The method according to claim 11, wherein the data packet comprises a service access request transmitted by the edge service node deployed in the edge data network; and
wherein the method further comprises:
selecting a target service node from edge service nodes deployed in the edge data network during identifying that the data packet is from the edge data network according to the network address and the source address of the data packet;
generating a response message for the service access request according to an identifier of the target service node, and
transmitting the response message to the network address translation entity, such that the network address translation entity transmits the response message to the edge data network through the GTP tunnel.

14. An apparatus in an edge computing scenario, wherein an edge data network is deployed in the edge computing scenario, the edge data network is connected to a core network through a first user-plane function entity, the core network is connected to a central data network through a second user-plane function entity and a network address translation entity, and an edge control node and an edge service node are deployed in the edge data network, the apparatus comprising:
at least one memory configured to store computer program code; and
at least one processor configured to access said computer program code and operate as instructed by said computer program code, said computer program code including:
first transmitting code configured to cause the at least one processor to transmit a network address assignment request to the network address translation entity after establishing a general packet radio service (GPRS) tunneling protocol (GTP) tunnel between the first user-plane function entity and the second user-plane function entity, the network address translation entity thereby assigning a network address to the GTP tunnel;
first notifying code configured to cause the at least one processor to notify the network address assigned by the network address translation entity to the GTP tunnel to the central data network;
first controlling code configured to cause the at least one processor to control a data packet to be transmitted by the edge service node to the central data network to be transmitted through the GTP tunnel, the network address translation entity thereby replacing a source address of the data packet with the network address; and
second transmitting code configured to cause the at least one processor to transmit the data packet to the central data network after the data packet arrives at the network address translation entity.

15. The apparatus of claim 14, wherein the computer program code further includes third transmitting code configured to cause the at least one processor to, before transmitting the network address assignment request to the network address translation entity, transmit a tunnel establishment request to a session management function entity in a case that it is detected that the GTP tunnel is not established between the first user-plane function entity and the second user-plane function entity, so that the session management function entity establishes the GTP tunnel.

16. The apparatus of claim 14, wherein the first controlling code is further configured to cause the at least one processor to set up internal routing in the edge data network, the internal routing configured for routing the data packet to be transmitted by the edge service node to the central data network to the GTP tunnel.

17. The apparatus of claim 14, wherein the computer program code further includes:
first receiving code configured to cause the at least one processor to receive the network address assignment request transmitted by the edge control node, the network address assignment request configured for requesting to assign the network address to the GTP tunnel established between the first user-plane function entity and the second user-plane function entity;
fourth transmitting code configured to cause the at least one processor to transmit the network address assigned to the GTP tunnel to the edge control node, such that the edge control node transmits the network address to the central data network; and
first replacing code configured to cause the at least one processor to, based on the data packet being received, replacing the source address of the data packet with the network address and then transmitting the data packet to the central data network, so that the central data network identifies a source of the data packet based on the network address.

18. The apparatus of claim 17, wherein the computer program code further includes:
  second replacing code configured to cause the at least one processor to, after the replacing the source address of the data packet with the network address and then transmitting the data packet to the central data network, based on a response message that is for the data packet and that is fed back by the central data network being received, replacing a destination address of the response message with an address specified by the edge service node, to obtain a processed response message; and
  fifth transmitting code configured to cause the at least one processor to transmit the processed response message to the second user-plane function entity, such that the second user-plane function entity transmits the processed response message to the edge service node through the GTP tunnel.

19. The apparatus of claim 14, wherein the computer program code further includes:
  first obtaining code configured to cause the at least one processor to obtain the data packet to be transmitted to the central data network; and
  sixth transmitting code configured to cause the at least one processor to transmit the data packet to the GTP tunnel established between the first user-plane function entity and the second user-plane function entity, to transmit the data packet to the central data network through the GTP tunnel.

20. A non-transitory computer-readable storage medium in an edge computing scenario, wherein an edge data network is deployed in the edge computing scenario, the edge data network is connected to a core network through a first user-plane function entity, the core network is connected to a central data network through a second user-plane function entity and a network address translation entity, and an edge control node and an edge service node are deployed in the edge data network, the storage medium storing computer instructions that, when executed by at least one processor of a device, cause the at least one processor to:
  transmit a network address assignment request to the network address translation entity after establishing a general packet radio service (GPRS) tunneling protocol (GTP) tunnel between the first user-plane function entity and the second user-plane function entity, the network address translation entity thereby assigning a network address to the GTP tunnel;
  notify the network address assigned by the network address translation entity to the GTP tunnel to the central data network;
  control a data packet to be transmitted by the edge service node to the central data network to be transmitted through the GTP tunnel, the network address translation entity thereby replacing a source address of the data packet with the network address; and
  transmit the data packet to the central data network after the data packet arrives at the network address translation entity.

\* \* \* \* \*